Jan. 7, 1958 C. O. KREUTZER 2,818,672
ELECTRICALLY SHOCKING ANIMALS IN CONTACT WITH
A PREDETERMINED REGION
Filed May 6, 1955
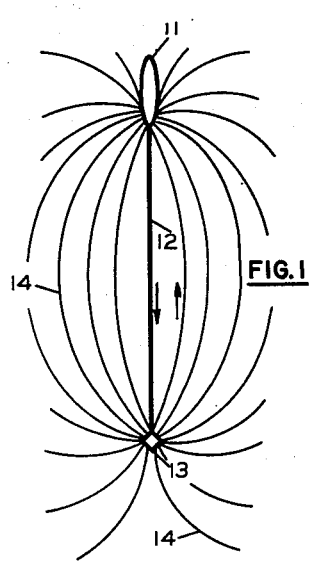
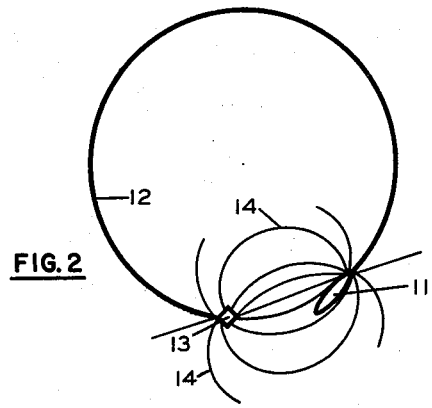
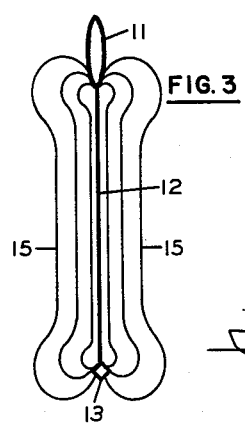
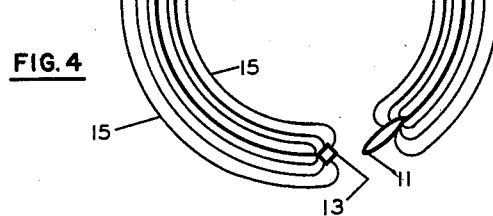
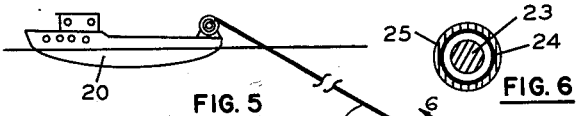
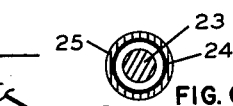
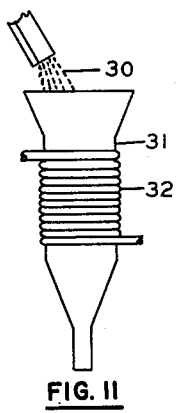
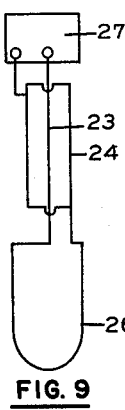
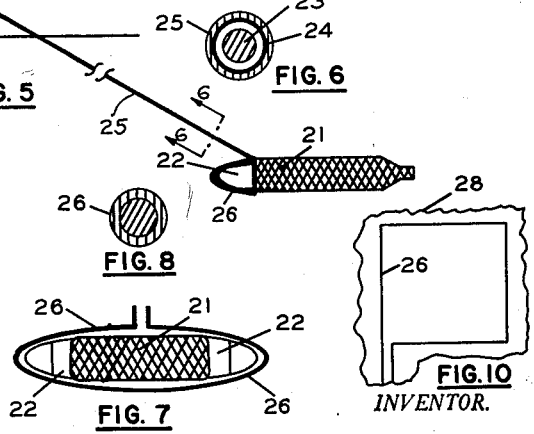
INVENTOR.
BY CONRADIN OTTO KREUTZER
ATTORNEY United States Patent Office 2,818,672
Patented Jan. 7, 1958

2,818,672

ELECTRICALLY SHOCKING ANIMALS IN CONTACT WITH A PREDETERMINED REGION

Conradin Otto Kreutzer, Meersburg, Bodensee, Germany, assignor to Fish Products Company, Lewes, Del., a corporation of Delaware Application May 6, 1955, Serial No. 506,597

8 Claims. (Cl. 43—17.1)

This invention relates to a novel method of and means for electrifying a predetermined region to shock animals in contact therewith to the predetermined degree required either to scare, stun or kill them. Since the invention is particularly suited for, but not limited to, use in connection with sea water, it is primarily explained in connection with its application to sea water.

When an electrical current flows through sea water, from one electrode to another, it will take the path of least resistance, and, in so doing, normally expand over a cross-sectionally large path of relatively low resistance. Whether the water is being electrified for fish catching or fish fencing purposes, the total or expanded region actually electrified normally is large in relation to the portion which can be used for the intended purpose; hence, most of the electrified space is wasted as is the power required to electrify it.

These and other disadvantages are substantially minimized, overcome or avoided by the present invention and such is its principal object.

Another important object is to concentrate the electrical current and force it to flow through the region in question along a predetermined or selected path so that its current density remains high enough to render most of the space usable and thus reduce wasted power to a minimum.

A further object is to accomplish the foregoing with relatively simple apparatus.

The present invention takes advantage of the fact that, when a primary impulse current, having a large A. C. component, is caused to flow through a cable which is submerged in seawater and which has, for said A. C. component, a large value of omega L in relation to the ohmic resistance of the "transformer" formed by the cable and the surrounding sea water, thereupon a secondary impulse current, corresponding to said A. C. component, will be induced in the water column around the cable. By using routine transformer-design principles, this secondary current may be made of a magnitude and nature such as to create, in the adjacent portion of the water, a voltage gradient of the magnitude required to cause the fish in that water to experience the desired degree of shock such as a scare shock, a stunning shock, or a killing shock.

The induced secondary current will also take the path of least resistance. But, since this path centers around the cable itself, the secondary current will concentrate in the induction area around and flow along the cable in a direction opposite to that of the primary current flow within the cable. Consequently, it becomes possible to concentrate the current in, and cause it to flow through, the water to form an electrical fence along a chosen path of regular or irregular contour as may be desired. As the resistance of the surrounding medium increases, the peak and average values of the induced current decreases, but, even when these values become small, my arrangement may be effectively employed to induce, within the bodies of small animals located in the surrounding medium, eddy currents sufficient to kill them. Consequently, by embedding the cable in the ground, say in the form of one or more loops encircling a given area, I can prevent certain animals, say rodents, from entering or leaving that area; and by arranging the cable to encircle a mass of grain, for example, I can kill insects in the grain. These and other applications will be readily apparent to those skilled in the art from the following description of the invention.

The invention is illustrated in the accompanying drawing, wherein:

Figures 1 and 2 show the expanded current flow paths obtained in relatively noninductive arrangements using straight and looped cables in the seawater;

Figures 3 and 4 show the confined current flow paths obtained in the practice of the present invention using inductive straight and looped cables in seawater;

Figures 5 through 8 illustrate the application of the invention in connection with deep sea trawling, Fig. 5 illustrating a trawling operation, Fig. 6 being a section taken along line 6—6 in Fig. 5 through a noninductive electrical supply cable extending between the trawl and the net, Fig. 7 illustrating a looped inductive cable extending around the mouth of the trawl net, Fig. 8 being a section through the looped inductive cable and Fig. 9 being a schematic view of the circuit involved;

Figure 10 illustrates an arrangement for electrically fencing-in a plot of ground; and Figure 11 illustrates an application of the present invention for killing insects in wheat or in like material.

A preliminary reference to the structure and operation of Figs. 1 and 2 may facilitate an understanding of the present invention. Figs. 1 and 2 illustrate straight and looped cable arrangements wherein a sustained direct current generator on vessel 11 is electrically connected through a supply cable 12 to an anode 13 to establish a flow of sustained D. C. current from the vessel 11, through cable 12 to anode 13 and thence through the water to a cathode electrode on the adjacent end of the vessel 11. In these arrangements, the current flows through the water in the expanded pattern indicated by the lines 14. Before passing it may be noted that the supply cable 12 of Figs. 1 and 2 may have a large inductance but, with sustained D. C., it does not induce a secondary current.

The arrangements of Figs. 3 and 4 are respectively identical to those of Figs. 1 and 2, except that the electrical generating equipment on vessel 11 provides a primary impulse current having a large A. C. component and the cable 12 connecting that equipment to the anode 13, is necessarily one of high inductance having, for said A. C. component, a large value of omega L in relation to its ohmic resistance. Since the current and the equipment used in Figs. 3 and 4 promote the transfer of energy from cable 12 by induction or "transformer action," an oppositely flowing current, corresponding to the A. C. component, will be induced in the adjoining water. This induced current will flow through the water in the concentrated pattern indicated by lines 15. The D. C. component of the impulse current flowing through cable 12 will not be inductively transferred. It will flow through the water from anode 13 to the cathode in an expanded pattern which is not indicated in Figs. 3 and 4 but which corresponds to the lines 14 of Figs. 1 and 2. However, since this D. C. component is small, the corresponding expanded current flow likewise is small.

In the practice of this invention, current impulses of either constant or alternating polarity may be used. In the straight cable arrangement of Fig. 3, the physical dimensions of the layout should be large so that the inductance of that cable will be large. This large inductance will cause the inductive reactance to be large when compared with the resistance of the layout. This resistance is the sum of the cable resistance, plus the expanding resistance at each electrode plus the resistance of the conducting water column.

The current concentrates more closely to the cable when the frequency of the alternating current, or of the A. C. component, is increased and also when the length or duration of the current impulse is decreased. The current within the cable and the induced current outside of the cable behave like the "hairpin" winding of a low inductance standard resistor so that the resultant inductance is practically zero.

By the use of this arrangement, the distribution of most of the current over a wide expansion path is prevented. The current density is kept high over the entire path; hence the shock effect is obtained along the entire current path. In this way, the percentage of effectively electrified space is substantially increased while wasted space and power are decreased. The created field is homogeneous in the direction of the length of the cable and varies along any path not parallel to the length of the cable, increasing as the cable is approached.

An electrical field of this character is especially suitable for electrical fish barricades. For the best results, the number of current impulses per second should be regulated. As pointed out in my co-pending application, Serial No. 468,098, filed Nov. 10, 1954, there are three impulse repetition rate ranges, including a low or fish scaring range and a high or fish stunning range, for each given specie and length of fish and these rate ranges change with changes in either specie or length. Thus the fish scaring repetition rate range for herring embrace all rates below a value approximately 27 pulses per second while for cod and tuna the corresponding values are 14 and 5 respectively. The effect of the layout is the same as that of a net. The mesh of the "electrical net" produced by this invention can be made finer by increasing and coarser by decreasing the magnitude of the pulse current.

When a double loop is used corresponding to a coil with two turns, the induced current will flow along a corresponding looped path having two turns. The zero-inductance characteristic of the layout is maintained. Where both turns are close together, the induced current from each turn will flow close together and thus double the intensity of the field without any change in the quantity of cable current. In that case the loss at the electrode is one-fourth the value of loss that would be present when the cable current is doubled and only one turn is used. The use of two or more turns thus makes possible the reduction of the physical dimensions and still satisfies the requirement that the inductive reactance of the cable be large in comparison with resistance of the layout.

A limit for the magnitude of the current impulses is determined by the design of impulse switches (ignitrons). If the current peak should be doubled, the potential would have to be doubled when using conventional electrode arrangements. By the use of the double turn cable, however, the potential only has to be increased by a small amount to obtain twice the current in the water. Only one-half of the current which flows through the water (when using the two turn cable) flows through the expanding resistance around the attractive electrode. When a barricade is needed which is to be effective to a given depth, the second and subsequent turns can be placed progressively deeper than the first turn, forming a helix.

The pulse current should be composed of short substantially spaced pulses, each having a peaked shape which is characterized by steep vertical sides, an A. C. component which is high in relation to its D. C. component and predetermined peak voltage and amperage values capable of creating induced peak electrical conditions of a character desired. Since the requisite voltage, amperage, contour and time characteristics of the impulse can be readily determined and provided by those skilled in the art, it should suffice to say that the impulse generating equipment may be of the character shown or indicated in my aforesaid co-pending application and in the U. S. Patent No. 2,426,037 to Mahoney et al., issued August 19, 1947.

Figs. 5–9 illustrate one application of the invention. Here a trawler 20 is towing a net 21 having wings 22 at a desired depth. It is said that, in an operation of this character, 90% of a school of herring located in the path of the net will escape capture because they are frightened by the noise of the operation when the net is within approximately ten feet of them. In accordance with my invention, however, the trawler is provided with suitable impulse generating apparatus, not shown, and this apparatus is electrically connected, through lead lines 23 and 24 which are conventionally incorporated in a noninductive cable 25, to an inductive cable 26 which is looped at least once around the mouth of the trawl net. The inductive cable 26 is intended to create an electrical field of sufficient intensity to stun quick moving fish at a distance ranging from say 15 to 25 or 30 feet in advance of it so as to be capable of stunning fish, such as herring before they are frightened by the noise of the trawling operation. It will be understood, of course, that the electrical circuit for this arrangement extends from one terminal of generator 27 successively through core conductor 23 of now inductive cable 25, core conductor of the inductive or looped cable 26, and sheathing conductor 24 of cable 25 back to the other terminal of generator 27.

To illustrate the trawling operation, by way of example, it is assumed that the trawler is equipped with an 800 volt and 140 amp. or 112 kw. D. C. generator which is used to charge a 550 microfarad condenser and that the latter is arranged to discharge through the induction cable 26 at a rate approximating 35 pulses per second, each pulse having peak voltage and amperage values of 3,000 and 12,000 respectively. I have found that, with one loop in cable 26, an arrangement of this character establishes a voltage gradient in seawater approximating voltage drops per foot of 2.8, 1.4 and 1.0 at distances ahead of the loop of 6, 15 and 30 feet respectively. With these peak electrical conditions in the water ahead of the net, it will be obvious that a given specie of fish having a minimum stunning voltage of 1.0 volt per foot of its length at a given pulse rate will be stunned at a distance of 30 feet ahead of the net. Likewise, fish requiring from 1.4 to 2.8 volts per foot will be stunned at distances ranging from 15 feet ahead of the net down to 6 feet.

In Figure 10, an induction loop 26 is placed on the surface of a plot of ground 28 or embedded in the ground and suitably charged with a pulse current designed to prevent small animals, say rodents, from entering or leaving the adjacent surface or underground region corresponding to that enclosed by the loop. If this adjoining region of the ground is highly conductive, an induced current will flow in the ground establishing a voltage gradient therein which should be large enough to subject rodents traveling on the surface of the ground or burrowing through the ground to an electrical shock of desired proportions. But, even if the resistance of the ground is high, so that the induced current does not provide the requisite voltage gradient in the ground itself, nevertheless, since the electrical resistance of the body of the rodent is relatively low, the inductive loop 26 can be designed to induce, directly within the body of the rodent, eddy currents of a size sufficient to shock the animal to the desired degree. However, where induced body currents are relied upon, it may normally be more feasible to scare the animal rather than to stun or kill it.

In Fig. 11 insects in a grain 30, such as wheat, are killed by passing the grain downwardly through a conduit 31, composed of a dielectric material, such as wood, and by subjecting this grain to a powerful electrical field. The field may be created by supplying pulse current to a coil or helix 32 which is wound around the conduit 31. In this manner, the requisite energy is induced within the bodies of the insects.

Having described my invention, I claim:

1. A method of electrifying a predetermined region of a body of water, land or other given material to subject an animal of given size or specie in contact with that region to a desired degree of shock, such as a scare shock, stunning shock or killing shock, comprising: generating a primary electrical current composed of short, relatively widely spaced impulses, having a peaked shape which is characterized by steep vertical sides and an A. C. component which is high in relation to its D. C. component; flowing said primary current through an electrical circuit including an elongate energy-transferring section having, for said A. C. component, a substantial inductive reactance value; and placing the energy-transferring section in close physical relationship to said predetermined region to establish therebetween an inductive energy-transferring coupling for inducing a current in said predetermined region of a large enough value to subject the animal to the desired shock.

2. The method of claim 1 wherein: said primary current flows through an elongate cable in said section.

3. The method of claim 2 wherein: the A. C. component of said primary current is transferred through said inductive coupling.

4. The method of claim 1 including: flowing said primary current through said section having a value of omega L which is large in relation to the ohmic resistance of said section and the adjacent region through which said induced current flows.

5. The method of electrifying a predetermined region of a body of water to subject fish of a given size or specie in contact with that region to a desired degree of shock, comprising: generating a primary electrical current composed of short, relatively widely spaced impulses having a peaked shape which is characterized by steep vertical sides and an A. C. component which is high in relation to its D. C. component; flowing said primary current through an electrical circuit including an elongate cable extending in close physical relation to said predetermined water region to induce a secondary current flowing along the outside of the portion of the cable immersed in the water, the omega L value of said cable being high in relation to the ohmic resistance of the "transformer" formed by said cable and said water.

6. Apparatus for electrifying a predetermined region or body of water, land or any other given material to subject an animal of a given size or specie in contact with that region to a desired degree of shock, comprising: a generator operative, when energized, to generate a primary electrical current composed of short, relatively widely spaced impulses having a peaked shape which is characterized by steep vertical sides and an A. C. component which is high in relation to its D. C. component; and means adapted to be placed in close physical relationship to said predetermined region and energized by said primary current, said means being operative, when so placed and energized, to induce, in said region, a substantial secondary current corresponding to said A. C. component.

7. The apparatus of claim 6 wherein: said means includes an elongate cable.

8. The apparatus of claim 7 wherein: said cable has a value of omega L which is high in relation to the ohmic resistance.

References Cited in the file of this patent
UNITED STATES PATENTS

| | | |
|---|---|---|
| 1,980,452 | Tice et al. | Nov. 13, 1934 |
| 2,233,045 | Bonner et al. | Feb. 25, 1941 |
| 2,426,037 | Mahoney et al. | Apr. 19, 1947 |
| 2,605,742 | Burkey | Aug. 5, 1952 |
| 2,745,205 | Kafka | May 15, 1956 |